Dec. 14, 1948.  O. R. NEMETH  2,456,530
PROJECTOR LAMP HOUSING AND COOLING SYSTEM THEREFOR
Filed May 22, 1944  3 Sheets-Sheet 1
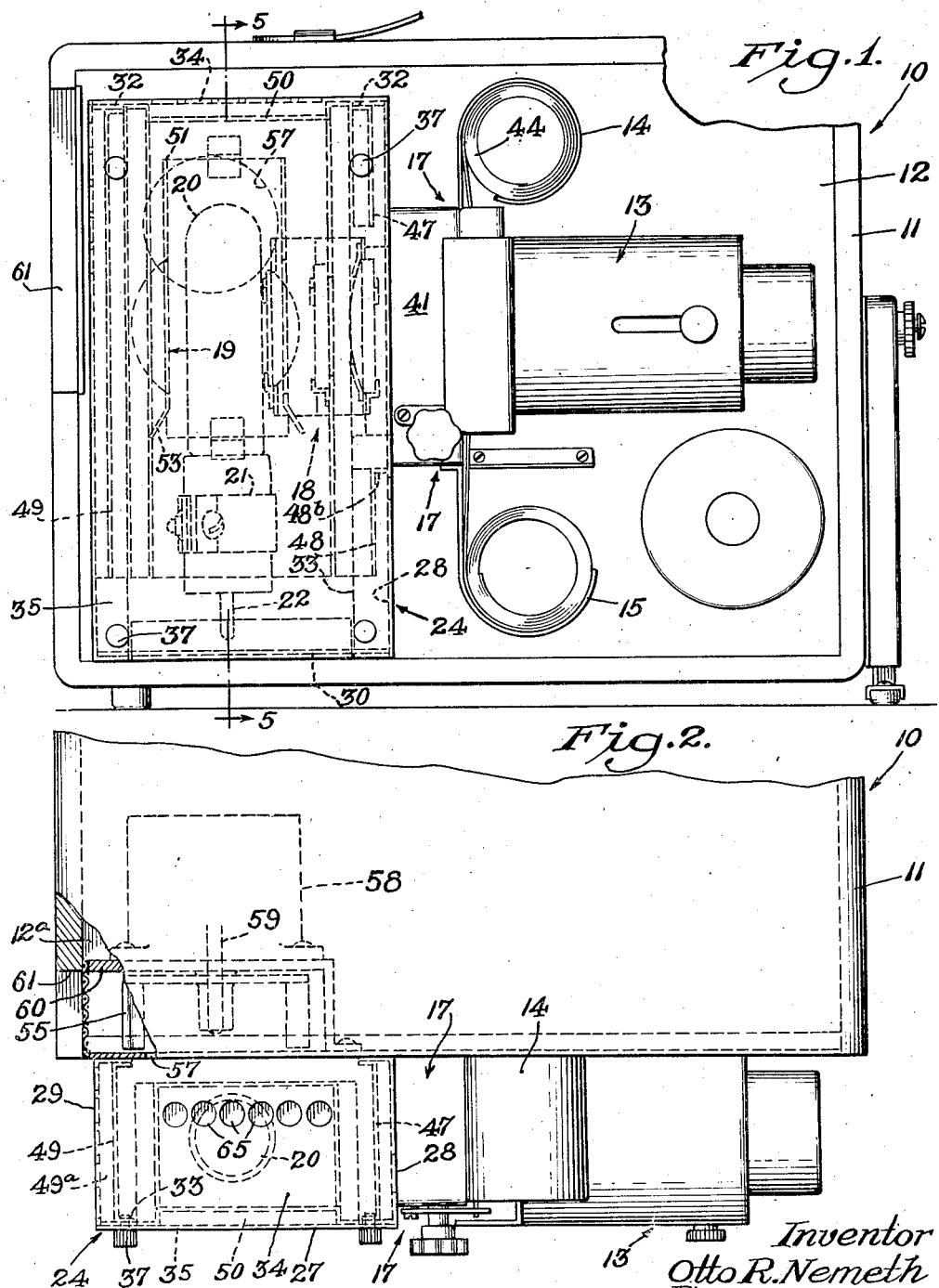
Inventor
Otto R. Nemeth
BY
R. J. Schwarz
Attorney.

Dec. 14, 1948.  O. R. NEMETH  2,456,530
PROJECTOR LAMP HOUSING AND COOLING SYSTEM THEREFOR
Filed May 22, 1944  3 Sheets-Sheet 2
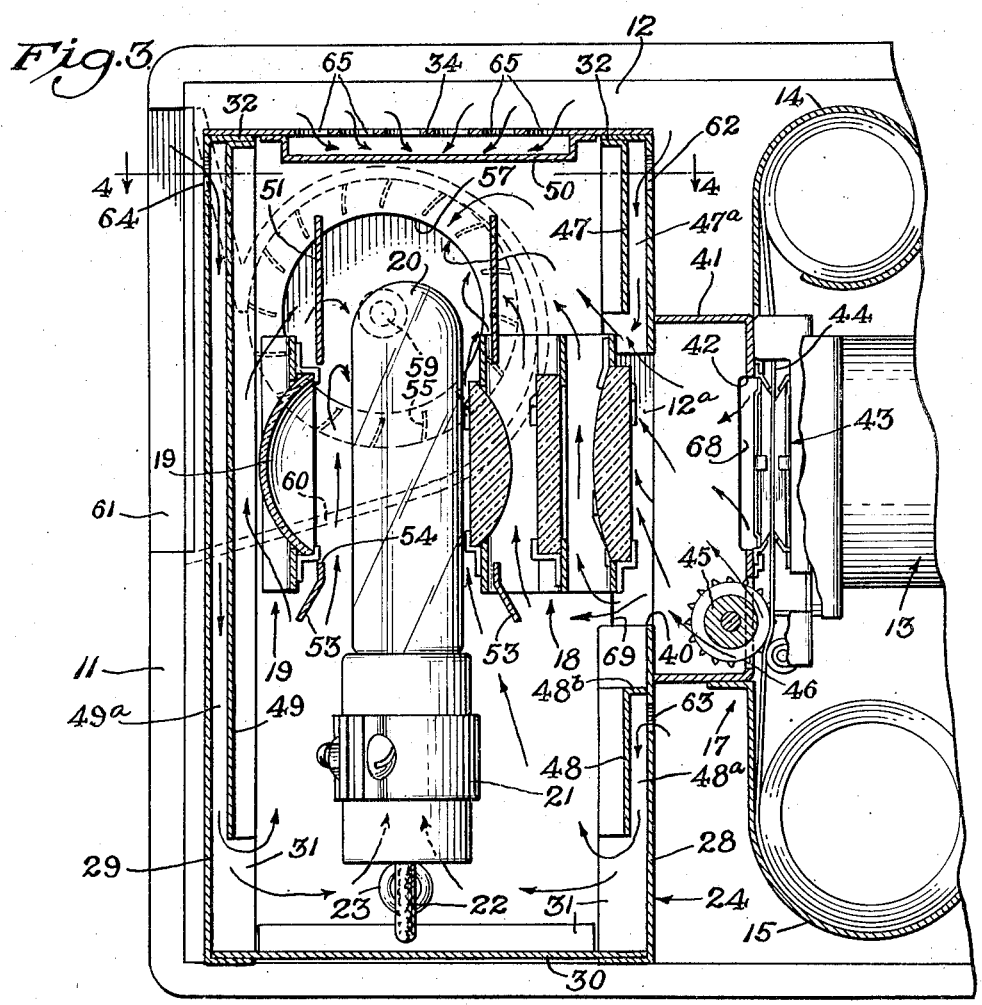
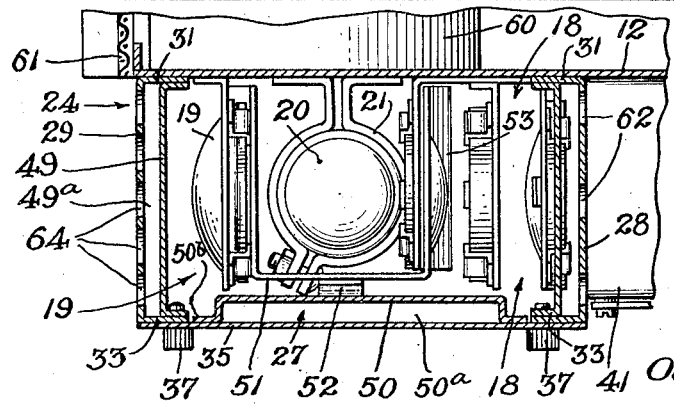
Inventor
Otto R. Nemeth
BY
R. J. Schwarz
Attorney.

Dec. 14, 1948. O. R. NEMETH 2,456,530
PROJECTOR LAMP HOUSING AND COOLING SYSTEM THEREFOR
Filed May 22, 1944 3 Sheets-Sheet 3

Inventor
Otto R. Nemeth
BY
R. J. Schwarz
Attorney.

Patented Dec. 14, 1948

2,456,530

UNITED STATES PATENT OFFICE 2,456,530

PROJECTOR LAMP HOUSING AND COOLING SYSTEM THEREFOR

Otto R. Nemeth, Chicago, Ill.

Application May 22, 1944, Serial No. 536,725

3 Claims. (Cl. 88—24)

This invention relates to improvements in projectors and more particularly concerns a novel lamp housing structure and cooling system therefor especially well adapted for, though not necessarily limited to use in projection machines of the type known as strip film projectors or slide projectors by which still images are thrown upon a screen.

An important aspect of the present invention resides in an improved cooling system for projectors by which the heat of the projection lamp is dissipated with utmost efficiency so that the projector will remain cool throughout the operating period.

Among the objects is to provide a novel method of and means for effecting cooling in the lamp housing of a projector.

Another object is to provide improved means for effecting an unusually efficient, well-distributed circulation of cooling air through the lamp housing and associated structure of a projector.

Another object is to provide novel suction-type ventilating system for the lamp housing of a projector.

Another object resides in the novel, compact, low cost construction of the lamp housing.

Still another object is to provide an improved construction whereby all walls of the projection housing which would normally be heated by radiation or convection are maintained safely and comfortably cool by the positive sweep of cooling air. Consequently the walls of the lamp housing, even though fully exposed to contact by the person operating the projector, may be constructed from relatively thin sheet metal without any danger of becoming dangerously or uncomfortably heated, although the structure is entirely free from heat dissipating fins or other such mechanical heat dissipating expedients.

Other objects, features, and advantages of the invention will be apparent from the following description and the accompanying three sheets of drawings in which:

Figure 1 is a side elevational view of a projector embodying the features of the invention.

Fig. 2 is a fragmentary top plan view of the projector, partly in section, particularly designed to show the lamp housing structure.

Fig. 3 is a fragmentary sectional and side elevational view, on a larger scale, of the lamp housing and associated film gate structure.

Fig. 4 is a horizontal sectional view taken along line 4—4 of Fig. 3.

Figure 5:
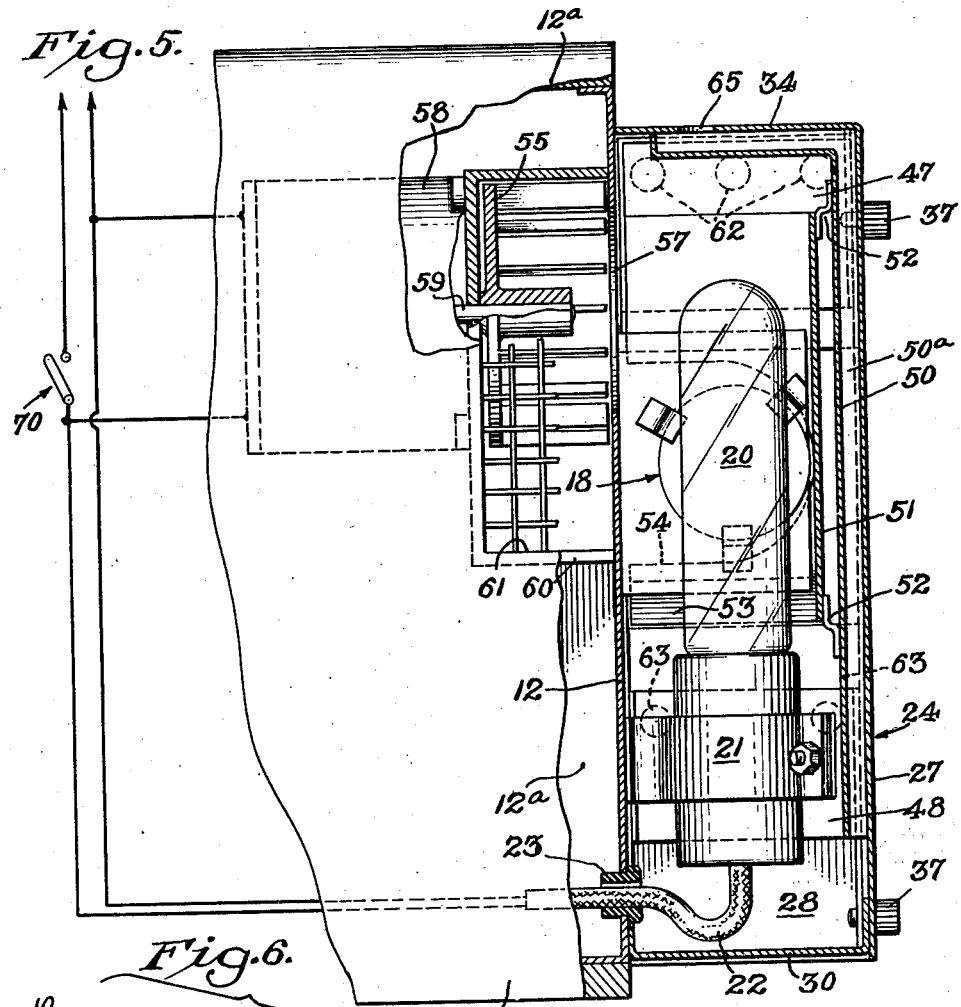
Fig. 5 is a vertical sectional view taken substantially along line 5—5 of Fig. 1.

Referring to Figs. 1 and 2, a projector 10 which may be of the type primarily adapted for strip film projection, but convertible to use with transparencies or slides, may comprise a case 11 of fabric-covered wood or the like supporting a vertical mounting plate or panel 12 which carries all or most of the operating mechanisms of the projector and closes off a chamber 12a within the case. Among the features of the panel-supported mechanism are included an objective supported within a housing 13, a film magazine structure including upper and lower chambers 14 and 15 respectively, a film gate structure 17, and a condenser lens unit 18. The objective, the film gate, and the condenser lens unit are in projection alignment one with the other and with a reflector unit 19 which is spaced rearwardly from the condenser lens unit to provide clearance for an interposed projection illuminant such as a lamp 20. Removably and adjustably supporting the lamp 20 is a split clamp 21 carried by the mounting plate 12 (Figs. 3, 4, and 5). Electrical energy for the projection lamp 20 may be supplied through a cable 22 leading from the chamber 12a through an insulating grommet 23 secured in the mounting plate 12 below the clamp 21.

Figure 6:
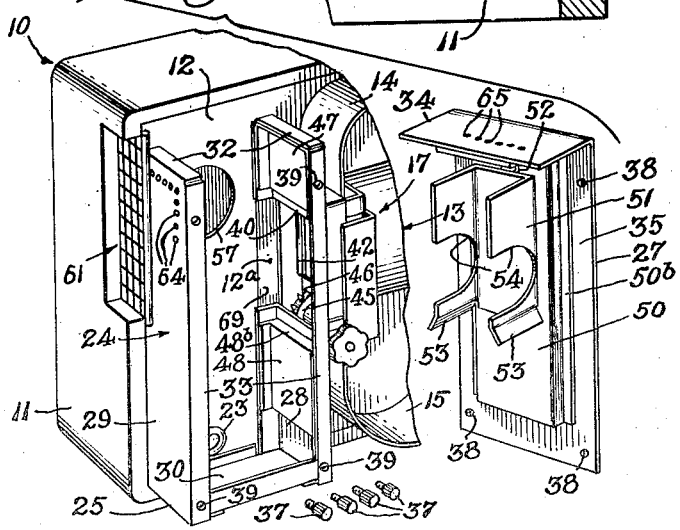
Fig. 6 is a perspective assembly view of the lamp housing of the projector with certain parts omitted for clarity of illustration.

According to the invention, an improved lamp housing 24 encloses the condenser lens unit 18, the reflector unit 19, and the projection lamp 20. For convenience in gaining access to the interior of the housing, particularly for replacing or adjusting the lamp 20, the housing 24 is preferably constructed in two principal sections comprising a main or fixed section 25 and a cover section 27 (Fig. 6). Both sections may be economically and effectively constructed of suitable gauge sheet metal, with the various parts required to be secured together preferably being spot welded.

The main section 25 comprises a front wall panel 28, a rear wall panel 29, and a bottom wall panel 30. All of these panels may have integral right angular flanges 31 bearing against and secured to the mounting plate 12. Along their upper edges the front and rear wall panels 28 and 29 have inturned horizontal reenforcing flanges 32 and at their outer vertical edges inturned reenforcing flanges 33. The flanges 32 and 33 are adapted to provide seats to receive the cover section 27 in overlapping relation. For this purpose the cover section 27 comprises a simple inverted L-shaped panel member having a relatively short top panel 34 and a right angularly related longer side panel 35 effective to close completely the top and side openings of the housing. Means for securing the cover section 27 in place on the seat flanges may comprise knurl-headed screws 37 the shanks of which are adapted to extend through apertures 38 in the side panel 35 and threadedly engage in tapped screw holes 39 in the vertical seating flanges 33. Thus, the cover section 27 can be quickly secured in place or removed, and when removed substantially entirely exposes the interior of the housing both at the outer side and at the top. This arrangement substantially facilitates insertion or removal of the projection lamp 20 which can thus be conveniently approached from the side and manipulated vertically with respect to the supporting clamp 21. Also facilitated is the mounting or adjustment of the condenser lens unit 18 and the reflector unit 19.

Within the front wall 28 of the housing is formed an appropriately dimensioned projection opening 40 enclosed at the outer or front face of the panel 28 by a supporting frame 41 forming part of the film gate structure 17. In a preferred arrangement, the frame 41 is mounted upon the front wall 28 and in unitary fashion supports the other elements of the film gate as well as the film magazine chambers 14 and 15. The front wall of the frame 41 has a projection opening 42 in front of which is mounted a separable pair of film gate plates 43 for holding a film strip 44 flat and stationary with relation to the projection axis of the machine during a projection interval. A film sprocket 45 is carried by the frame 41 and projects peripherally through a sprocket aperture 46 below the projection opening 42 into engagement with the film strip 44 for intermittently advancing the film strip. For additional details of the film gate structure 17 reference may be had to my co-pending application, Serial Number 536,720, filed May 22, 1944.

During operation, the projection lamp 20 generates intense heat, which would be transferred by radiation and convection to the walls of the lamp housing 24, and render the same searingly hot, in the absence of means for preventing accumulation of and dissipating the heat. However, according to the present invention substantially all internal surface areas of the housing which would be heated by radiation or convection are shielded, and improved circulation of cooling air carries off the heat continuously during operation of the lamp. In practice, it has been found that the heat is disposed of with such efficiency that the external temperature of the lamp housing 24 is never more than mildly warm throughout the operation of the machine and even after prolonged operation.

As best seen in Figs. 3, 4, and 5, the front wall 28 of the housing is protected from the heat of the lamp 20 by shield plates 47 and 48 located in spaced parallel relationship to the internal wall areas respectively above and below the projection aperture 40. In heat shielding relation to the rear wall 29 is a spaced parallel vertical shield plate 49. In heat shielding relation to the cover 27 is an inverted L-shaped shield plate 50 having a short leg panel in spaced parallel relation to the top panel 34 and a longer leg panel in spaced parallel relation to the larger side panel portion 35 of the cover.

The shield plates 47, 48, and 49 are appropriately flanged and secured permanently in place against the wall panel flanges 31 and 32, as the case may be, to form with the wall panels closed air spaces 47a, 48a, and 49a, respectively, adapted to take advantage of the insulating value of confined air. These air spaces are entirely closed with respect to the interior of the lamp housing at the top and sides, even the air space 48a, being closed at the top by a closure flange 48b, but are all open at the bottom for a purpose which will presently appear. The air space 47a opens adjacent to the top of the condenser lens unit 18 while the air spaces 48a and 49a open in a common horizontal plane at or adjacent to the bottom of the base of the lamp 20 spaced upwardly from the bottom 30 of the housing. For similar purpose and effect the shield plate 50 provides an air space 50a and is provided with a marginal L-shaped flange structure 50b by which it is secured to the top and side panel portions 34 and 35 of the cover 27 to close off the air space 50a entirely from the interior of the housing except at the bottom where an open mouth is provided which in assembly is preferably disposed in the same horizontal plane as the mouths of the air spaces 48a and 49a.

Strong bracing and reenforcement of the lamp housing shell results from the manner in which the several shield plates cooperate with the contiguous parts of the housing. The cover 27, in particular, benefits from the reenforcement since this maintains the top and side panels 34 and 35 against distortion and assures a permanent proper angular relationship thereof in spite of handling which might otherwise cause them to be bent out of true.

Additional or supplementary heat shielding means in the form of an inwardly opening vertically elongated channel or U-shaped sheet metal member 51 is mounted through the medium of attachment brackets 52 with its web in spaced parallel relation to the inner face of the longer vertical panel of the shield plate 50. The shield 51 is of such length and depth and is mounted at such a height as to surround the lamp 20 in substantially uniformly spaced relations at the front, rear and outer sides and define a vertical flue about the lamp. Since the shield 51 is spaced from the supporting shield plate 50 and, in assembly, from the adjacent element of the condenser lens unit 18 and the shield plate 47 as well as from the shield plate 49, vertical intervening flue spaces are provided which tend to facilitate and accelerate upward convectional movement of cooling air during operation of the lamp. Air deflecting flanges 53 formed in respectively forwardly and rearwardly flaring relation along the lower margins of the inwardly extending wings of the shield 51 have the effect of funneling upwardly traveling cooling air into the air flue formed about the lamp 20 by the shield member. Axially aligned cut-outs 54 in the wings of the shield 51 are coaxial with the projection axis of the condenser lenses of the unit 18 and the reflector of the unit 19 to permit passage of the projection light beam. By having the rear edges of the wings of the shield 51 located relatively close to the adjacent face of the mounting plate 12 in the assembled condition of the apparatus, and by the relatively close cooperation of the adjacent element of the condenser lens unit 18 adjacent to the front cut-out 54 providing a substantial though non-contacting closure for such cut-out while the reflector unit 19 similarly cooperates to provide a closure for the rear cut-out 54, the flue about the lamp 20 is of such character as to promote a rather vigorous cooling flow of air sweeping upwardly about the lamp 20, while substantially preventing lateral ingress of cold air to contact the projection lamp.

Heat dissipating circulation of cooling air within the housing 24 is stimulated by a turbo-blower 55 which is disposed to withdraw heated air from the housing through a concentric suction port 57 in the mounting plate 12 adjacent to the top of the air flue defined by the lamp shield 51. As best seen in Figs. 3 and 5 disposition of the suction port 57 is such with relation not only to the top of the flue surrounding the lamp 20 but also to the flue spaces about the shield 51 as to accomplish the most effective withdrawal of air after maximum heat transfer to the air. The blower 55 is driven by a motor 58 through the medium of a shaft 59 and is mounted within a blower housing 60 associated with or mounted upon the inner face of the mounting plate 12 and having a grill-protected exhaust port 61 opening through the rear wall of the casing 11.

In a large measure, the effectiveness of cooling according to the present invention accrues from intensive exploitation of the heat insulating value of layers of air and the heat absorbing potentialities of cold and expanding air sweeping the surfaces to be cooled. To this end, air at atmospheric temperature is drawn into the lamp housing 24 and caused to travel a circuitous path, sweeping in heat abstracting relation through the zone of potentially highest temperature a plurality of times. As the temperature of the air and consequently its volume increase in its cooling sweep, I cause the velocity of the air to accelerate substantially over the rate at which it would normally travel due to convection alone. Furthermore, the cold or atmospheric air is caused to sweep first the internal housing wall area which is potentially liable to the most severe overheating because of proximity to the major heat zone of the lamp. At the same time, the onwardly moving cold air is confined to a layer intervening as an insulation between the heat source and the housing wall area. After the cooling air has moved on beyond the major heat zone, its flow is reversed to traverse the major heat zone again and serve as a live heat-insulating layer intervening between the heat source and the housing wall area as well as between the heat source and the layer of newly indrawn air sweeping such wall area. As a result, the housing is maintained unusually and uniformly cool.

In carrying out my method, important advantages accrue from the large suction capacity of the turbo-blower 55 by the action of which fresh cooling air from the exterior of the lamp housing is drawn in to sweep downwardly through the air spaces 47a, 48a, 49a, and 50a to issue through the mouths at the bottom of the air spaces. For this purpose a series of inlet air ports 62 is provided in the forward wall panel 28 adjacent to the top of the air space 47a, a series of air intake ports 63 adjacent to the top of the air space 48a, and a numerous series of air intake ports 64 is provided in the rear wall panel 29 adjacent to the top of the air space 49a. A series of air inlet ports 65 provided in the top panel 34 of the closure 27 permits fresh cold air to be drawn into the air space 50a. By having the majority of air intake ports adjacent to or at the top of the lamp housing, the fresh cool air is drawn in to sweep first what would normally be the hottest portion of the lamp housing. Then as the air travels down through the various air ducts it expands under the dual effects of rising temperature and suction and uniformly abstracts the ambient lamp-generated heat from the shield plates 47, 48, 49, and 50 while at the same time providing an insulating air layer in the flat air ducts.

It may also be remarked that by having the preheated air that issues from the intake air ducts 48a, 49a, and 50a enter the main chamber of the lamp housing well below the active glass-enclosed portion of the lamp 20 to sweep and cool the base of the lamp before sweeping the active portion of the lamp, the air will be sufficiently preheated to avoid undue or damaging chilling of the lamp. Furthermore, the air comes in from the ducts in such a uniformly distributed manner all about the base of the lamp that the lamp is at all times completely enveloped by a substantially uniform volume, as well as uniformly tempered cooling air. The number and size of the several series of inlet air ports is, of course, so calculated as to admit the proper amount of air into each of the respective air ducts for attainment of optimum uniformity and efficiency of results.

As the air leaves the mouths of the ducts 48a, 49a, and 50a it abruptly reverses direction and sweeps upwardly through the flue spaces surrounding the lamp 20, carrying off ambient heat from the inner surfaces of the shield plates 48, 49, and 50 and all surfaces of the shield member 51. At the same time the upwardly moving air provides insulating air layers in the flue spaces.

Inasmuch as a substantial amount of heat is concentrated in the projection light beam created by the reflector 19 and the condenser lens unit 18 the construction and arrangement is preferably such that the suction created by blower fan 55 also creates cooling air flow through the film gate structure 17 and through the condenser lens unit 18. Accordingly, cold or atmospheric air is adapted to be drawn in past and sweeping the film gate plates 43 and the film strip 44, through the projection opening 42 in the film gate frame 41 as well as through enlargements of such opening at cutbacks 68. Cool air is also adapted to be drawn in through the sprocket aperture 46 to cool the sprocket and the adjacent portions of the film strip 44. The cool air thus drawn in through the film gate structure enters the lamp housing through the projection opening 40, which may be larger than actually required for the projection beam, particularly below the condenser lens unit 18. Cool air entering through the sprocket aperture 46 will be drawn upwardly to sweep through the condenser lens unit to combine with the air which otherwise passes through the projection opening 40. In addition, of course, the cooling air which travels upwardly from the inlet duct 48a and the air issuing from the mouth of the inlet duct 47a sweeps the condenser lenses. The combined volume of cooling air, adequately pre-heated by the projection beam as well as various heated parts of the apparatus, acts effectively to maintain the condenser lenses adequately cool but free from detrimental temperature variations and thus unequal expansion, thus avoiding danger of cracked lenses.

Ventilation of the interior chamber 12a of the casing 11 is adapted to result from the withdrawal of air through an opening 69 in the mounting plate 12 at the projection opening 40. The air issuing from the ventilation opening 69 assists in regulating the temperature of the air which sweeps into the lamp housing through the projection opening 40.

In order to assure that the motor 58 will operate to drive the suction blower 55 whenever and at all times that the lamp 20 is in operation, the electrical circuits connecting the motor and the blower to the source of electrical energy are preferably integrated through the medium of a common master switch 70. Thus, when the switch 70 is closed parallel electrical energizing circuits for the blower 55 and the motor 58 are completed simultaneously. Likewise, stopping of the motor also results in opening of the lamp circuit.

From the foregoing it will be apparent that this invention provides for unusually efficient and complete ventilation and cooling of the lamp housing as well as the associated condenser lens and film gate structures. Among the several advantages accruing from this may be mentioned that the lamp housing may be constructed from relatively thin and light weight sheet material, the condensing lens unit may be mounted unusually close to the projection lamp, and heat and light shields as well as the housing walls can also be disposed relatively close to the lamp. Thus, the entire construction can be made quite compact. It has been found in practice that as a result of the high cooling efficiency of the present system in a typical installation, a person may at any time during the operation of the projector safely place and hold his hand on any external area of the lamp housing which will actually feel only comfortably warm.

Although the specific projector 10 selected for the illustrative environment of the invention herein is of the type used in projecting still pictures, this should not be construed as limiting the scope of the invention because many, if not all, features of the invention are applicable as well to motion picture projectors in which such features have been used and found quite effective in practice.

The expression "lamp" as used in the claims is intended to convey a generic meaning equivalent to and merely a short term for "illuminant" whether incandescent lamp, arc light, or other medium.

While I have illustrated and described a certain preferred embodiment of my invention, it is to be understood that I do not thereby intend to limit my invention to the specific form disclosed, but contemplate that various modifications, substitutions, and alternative constructions may be effected without departing from the spirit and scope of the invention as defined in the appended claims.

I claim:

1. In combination in a projector lamp housing, external walls surrounding a space to be occupied by a projection lamp within the housing, respective inner heat shielding walls mounted in spaced relation to said external walls and cooperating therewith to provide air ducts, said air ducts being open to atmosphere at their upper ends and being open to the interior of the housing at their lower ends, additional heat shielding structure arranged on at least three sides of said projection lamp space and spaced from the lamp and from said heat shielding walls whereby to provide air flues about the lamp and between the heat shielding walls and said heat shielding structure in communication with the inner ends of said air ducts, and means for creating forced circulation of air from atmosphere downwardly through the air ducts and thereafter upwardly through said air flues, thus providing three insulating and cooling layers of moving air between the lamp and the exterior walls.

2. A lamp housing construction including wall portions adapted to be fixedly secured relative to a supporting structure in a picture projector, said wall portions defining an opening of sufficient size to enable entrance into and out of the housing for a projection lamp adapted to be located substantially centrally within the housing, an openable closure structure for closing said opening, heat shielding wall panels carried by said wall portions and by said closure structure, respectively, and providing cooling air ducts, and additional heat shielding means mounted in spaced relation to the heat shielding wall panel on the closure structure, and adapted for relatively close shielding approach to the lamp, said additional shielding means cooperating with said heat shielding wall panels to form interior air flues, and means for creating forced circulation of air downwardly through said ducts and then upwardly through said interior flues successively.

3. A lamp housing as defined in claim 2 wherein said additional heat shielding means includes as an active part thereof a reflector structure located behind the projection lamp for throwing light rays therefrom in the direction of the projection light beam to be created by the lamp.

OTTO R. NEMETH.

REFERENCES CITED

The following references are of record in the file of this patent:

UNITED STATES PATENTS

| Number | Name | Date |
|---|---|---|
| 1,160,764 | Robinson et al. | Nov. 16, 1915 |
| 1,925,149 | McCandless | Sept. 5, 1933 |
| 1,966,531 | Tint | July 17, 1934 |
| 2,135,996 | Wood | Nov. 8, 1938 |
| 2,160,890 | Mulch | June 6, 1939 |
| 2,269,794 | Stechbart | Jan. 13, 1942 |
| 2,281,988 | Osterberg et al. | May 5, 1942 |
| 2,344,263 | Perkins | Mar. 14, 1944 |